US012351458B2

(12) United States Patent
Damstedt et al.

(10) Patent No.: US 12,351,458 B2
(45) Date of Patent: Jul. 8, 2025

(54) METHODS OF OPERATIONAL FLEXIBILITY IN PARTIAL OXIDATION

(71) Applicants: Bradley D. Damstedt, Williamsville, NY (US); Lawrence E. Bool, East Aurora, NY (US)

(72) Inventors: Bradley D. Damstedt, Williamsville, NY (US); Lawrence E. Bool, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 774 days.

(21) Appl. No.: 17/543,875

(22) Filed: Dec. 7, 2021

(65) Prior Publication Data

US 2022/0234887 A1 Jul. 28, 2022

Related U.S. Application Data

(60) Provisional application No. 63/141,042, filed on Jan. 25, 2021.

(51) Int. Cl.
*C01B 3/36* (2006.01)
*C10J 3/72* (2006.01)

(52) U.S. Cl.
CPC ........ *C01B 3/36* (2013.01); *C01B 2203/0255* (2013.01); *C01B 2203/1241* (2013.01); *C01B 2203/148* (2013.01); *C01B 2203/1614* (2013.01); *C01B 2203/169* (2013.01); *C10J 3/72* (2013.01); *C10J 2300/0916* (2013.01); *C10J 2300/1656* (2013.01)

(58) Field of Classification Search
CPC .............. C01B 3/36; C01B 2203/0255; C01B 2203/1241; C01B 2203/148; C01B 2203/1614; C01B 2203/169; C01B 13/02; C01B 2203/025; C01B 2203/0283; C01B 2203/04; C01B 2203/0475; C01B 2203/062; C01B 2203/0894; C01B 2203/16; C10J 3/72; C10J 2300/0916; C10J 2300/1656; C10J 2300/0959; C10J 2300/1253; C10J 2300/1846; C10J 2300/1884; C10J 2300/1892; C10J 3/466; C10J 3/84; C10J 2300/1609; C10K 1/003; C10K 3/005

See application file for complete search history.

(56) References Cited

U.S. PATENT DOCUMENTS 5,266,024 A    11/1993   Anderson
9,290,422 B2    3/2016   Drnevich et al.
(Continued)

OTHER PUBLICATIONS

Zohreh Ravaghi-Ardebilia, Flavio Manentia, Carlo Pirolab, Fiona Soaresc, Michele Corbettaa, Sauro Pieruccia, and Eliseo Ranzia, "Influence of the Effective Parameters on H2:CO Ratio of Syngas at Low-Temperature Gasification", 2014, Chemical Engineering Transactions, 37, 253-258 (Year: 2014).*
(Continued)

*Primary Examiner* — Daniel C. McCracken
*Assistant Examiner* — Joshua Maxwell Speer
(74) *Attorney, Agent, or Firm* — Andrew G. Melick

(57) ABSTRACT

Disclosed are methods for accommodating changes in the conditions of partial oxidation of hydrocarbonaceous feedstock by changing characteristics of the hot oxygen used in the partial oxidation.

13 Claims, 3 Drawing Sheets

(56) References Cited

U.S. PATENT DOCUMENTS

| | | |
|---|---|---|
| 9,624,440 B2 | 4/2017 | Chakravarti et al. |
| 2004/0151663 A1 | 8/2004 | Nougier et al. |
| 2012/0023822 A1* | 2/2012 | D'Agostini .............. C10J 3/723 |
| | | 48/197 R |
| 2012/0291351 A1 | 11/2012 | Bool et al. |
| 2014/0367614 A1 | 12/2014 | Damstedt et al. |
| 2016/0102259 A1 | 4/2016 | Bool et al. |
| 2016/0176793 A1* | 6/2016 | Chakravarti .............. C01B 3/36 |
| | | 518/703 |

OTHER PUBLICATIONS

Amr Attia and Ahmed Emara, an Investigation of Acetylene/Argon Gas Additives to Natural Gas on the Laminar Diffusion Flame Characteristics for a Honeycomb Gaseous Burner, Nov. 2016, Proceedings of the ASME 2016 International Mechanical Engineering Congress & Exposition (DOI: 10.1115/IMECE2016-66010) (Year: 2016).*

N. M. Pogosyana, M. Dzh. Pogosyana, L. N. Strekovab, L. A. Tavadyana, and V. S. Arutyunovb, "Effect of the Concentrations of Methane and Ethylene on the Composition of the Products of Their Cooxidation", Dec. 9, 2013, Russian Journal of Physical Chemistry, vol. 9, No. 2, pp. 218-222 (Year: 2015).*

Vasilis Papavassiliou, Perry Pacouloute, KT Wu, Raymont Drnevich, Dionisios Vlachos, John Hemmings, and Leo Bonnel, "Catalytic Partial Oxidation Pilot Plant Study", 2010, Ind. Eng. Chem. Res., 49, 94-103 (Year: 2010).*

* cited by examiner

METHODS OF OPERATIONAL FLEXIBILITY IN PARTIAL OXIDATION

RELATED APPLICATIONS

This application claims the benefit of U.S. Provisional Application Ser. No. 63/141,042, filed on Jan. 25, 2021, which is incorporated herein by reference.

FIELD OF THE INVENTION

The present invention relates to production of hydrocarbon products by methodology that utilizes partial oxidation ("POx") of hydrocarbon feedstock material.

BACKGROUND OF THE INVENTION

Plants for producing hydrocarbon products from hydrocarbon feedstock materials often operate within predetermined conditions that are based on an assumed set of characteristics including the characteristics of the feedstock material and on the desired characteristics of the product that is produced. However, when there is a change in the characteristics of the feedstock material (including inherent properties such as its composition, but also extrinsic properties such as its feed rate), the operator usually is forced to discontinue operations and/or to install costly substitute methodology to accommodate the change.

Methodology of this general type which can be vulnerable to this sort of disruption is described in U.S. Pat. No. 9,624,440 and U.S. Published Patent Application No. US2016/0102259. Adaptation of this type of methodology is described in U.S. Pat. No. 9,290,422, which discloses adding equipment such as an autothermal reactor ("ATR") to equipment already in place for the generation of liquid fuels from the source material.

The present invention adds flexibility and operational efficiency to the methodology of producing hydrocarbon products useful in producing products such as fuels.

BRIEF SUMMARY OF THE INVENTION

The present invention is a method of carrying out partial oxidation of carbonaceous feedstock to produce syngas, comprising (A) (i) feeding to a partial oxidation reactor feedstock having a given total hydrocarbon concentration, a given concentration of $C_2H_2$, $C_2H_4$, and tars, and a given temperature, (ii) partially oxidizing the feedstock in the partial oxidation reactor, using a hot oxygen jet that has given values of its temperature, velocity, and $O_2$ concentration, at given partial oxidation conditions of temperature, residence time, pressure, specific oxygen consumption, ratio of oxygen in the hot oxygen jet used in the partial oxidation to the feedstock, and entrainment rate of the feedstock into the hot oxygen jet, (iii) wherein the hot oxygen jet is produced by reaction of oxygen and fuel in a hot oxygen generator at a given stoichiometric ratio (HSR) in the hot oxygen generator and a given temperature of the oxygen that is fed to the hot oxygen generator, (iv) to produce syngas having given values of temperature, soot concentration, $CH_4$ concentration, and tar concentration;

(B) changing at least one of the total hydrocarbon concentration, $C_2H_2$ concentration, $C_2H_4$ concentration, tars concentration, and temperature, of the feedstock fed to the partial oxidation reactor to form a changed feedstock, wherein partially oxidizing said changed feedstock under said given partial oxidation conditions of (A)(ii) using a hot oxygen jet having the given values set forth in (A)(ii) produces syngas having a temperature, soot concentration, $CH_4$ concentration, and tar concentration, fed to the partial oxidation at least one of which differs from its given value according to (A)(iv) by a given increment;

(C) changing at least one of the values of temperature, velocity, and $O_2$ concentration, of the hot oxygen jet from its value in (A)(ii) to produce a changed hot oxygen jet, by changing one or more of the HSR in the hot oxygen generator and the temperature of the oxygen that is fed to the hot oxygen generator to produce the hot oxygen jet in the hot oxygen generator, and (D) partially oxidizing said changed feedstock in said partial oxygen reactor with said changed hot oxygen jet, to produce syngas whose temperature, soot concentration, $CH_4$ concentration, or tar concentration, which differed in (B) from the given value thereof according to (A)(iv), differs from said given value by an increment that is less than the increment thereof set forth in (B).

As used herein, "hot oxygen stoichiometric ratio", and "HSR" mean the ratio of moles of contained oxygen in the oxidant fed to the burner to the moles of oxygen that would be required to completely combust the fuel fed to the burner. As used herein, "total stoichiometric ratio" and "TSR" mean the ratio of moles of contained oxygen in the oxidant fed to the burner to the moles of oxygen that would be required to completely combust the total of the fuel fed to the burner, plus the auxiliary fuel, plus all combustible feeds fed to the reactor.

DETAILED DESCRIPTION OF THE INVENTION

The present invention is particularly useful in operations that convert hydrocarbon products such as biomass to useful hydrocarbon products such as (but not limited to) liquid fuel. The products produced by the present invention includes products that can be sold and used as-is, as well as products that can be used as reactants to produce other finished useful products that can then be sold and used.

Figure 1:
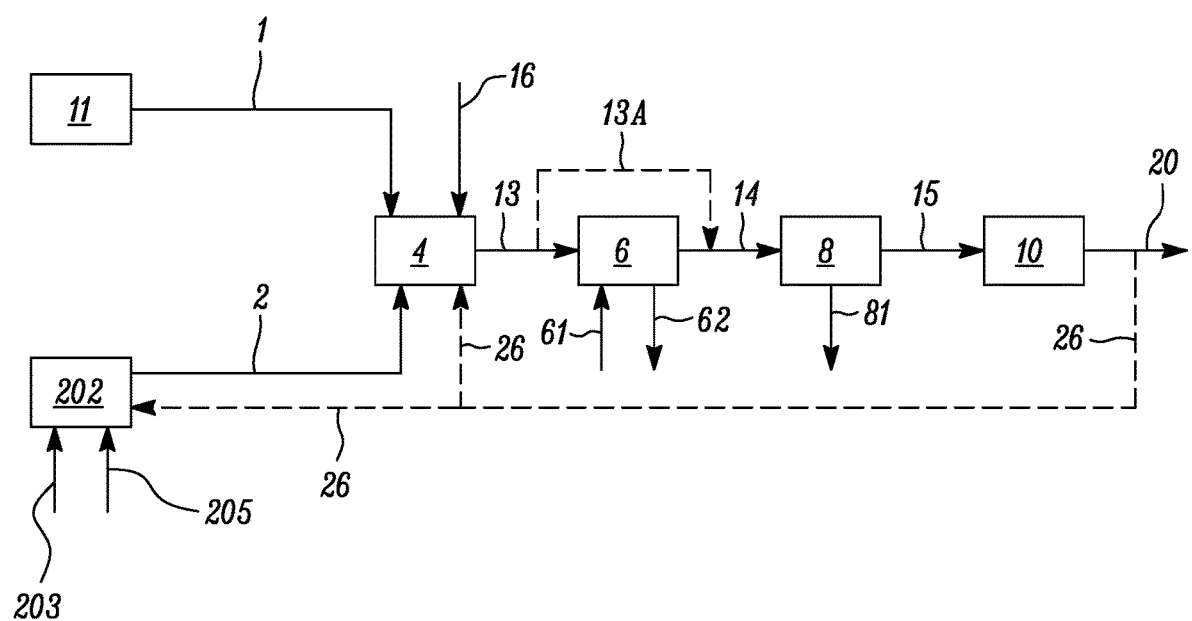
FIG. 1 is a flowsheet of a facility for producing hydrocarbon liquids such as fuels from feedstock such as biomass.

FIG. 1 is a flowsheet that shows the typical steps of such an operation.

Referring to FIG. 1, stream 1 which is also referred to herein as the raw feedstock is fed to partial oxidation reactor 4. Stream 1 is provided from source 11 which designates a production facility or reactor in which raw feedstock 1 is produced.

Examples of suitable raw feedstocks 1 and their sources 11 include:

Natural gas, from any commercial source thereof;

the gaseous stream that is produced by a gasification reactor, in which solid hydrocarbon material such as biomass or solid fuel such as coal or lignin is gasified in a stream of gas usually comprising air, steam, and/or oxygen at a high enough temperature that at least a portion of the solid material is converted to a gaseous raw stream 1;

product streams and byproduct streams, which more often are gaseous but may be liquid and/or solids, that are produced in a petrochemical refinery or chemical plant;

coke oven gas, being the offgas stream that is produced in a reactor that heat treats coal to produce coke;

pyrolysis gas, being a hydrocarbon-containing gaseous stream that is produced in a reactor to heat treat solid carbonaceous material such as fossil fuel or biomass to devolatilize and partially oxidize the solid material;

Other possible feedstock streams include oils, such as pyrolysis oils, and liquid hydrocarbons.

Raw feedstock 1 generally contains hydrogen and carbon monoxide (CO), and typically also contains one or more hydrocarbons such as alkanes and/or alkanols of 1 to 18 carbon atoms, and often contains one or more of carbon dioxide ($CO_2$), and higher molecular weight hydrocarbons characterized as tars and/or soot.

The raw feedstock stream 1, if heated as it leaves source 11, typically exhibits a temperature of between about 500° F. and 1600° F.

Raw feedstock stream 1 is then fed into partial oxidation reactor 4 in which it is reacted (under conditions described more fully below) with oxygen that is provided as hot oxygen stream 2 (produced as more fully described below) to produce additional amounts of hydrogen and carbon monoxide (CO) from components present in stream 1. If tars are present in the stream, some or all of tars present can also be converted to lower molecular weight hydrocarbon products.

Steam, represented as stream 16, can optionally also be added to reactor 4, as described herein.

Oxidized product stream 13 which is produced in partial oxidation reactor 4 is fed to stage 6 in which stream 13 is preferably cooled and treated to remove substances that should not be present when the stream is fed to reactor 10 (described hereinbelow). Stage 6 typically includes a unit which cools stream 13, for instance by indirect heat exchange with incoming feed water 61 to produce stream 62 of heated water and/or steam. In alternative embodiments, stage 6 can also comprise a shift conversion reactor in which carbon monoxide in stream 13 is reacted (in a non-limiting example, with water vapor (steam)) in a catalytically mediated water-gas shift ("WGS") reaction to produce hydrogen, thereby providing a way to adjust the ratio of hydrogen to carbon monoxide in stream 13.

The resultant stream 14, having been cooled and/or having had its hydrogen:CO ratio adjusted in stage 6, is fed to stage 8 in which impurities 81 that may be present such as particulates, acid gases including $CO_2$, ammonia, sulfur species, and other inorganic substances such as alkali compounds, are removed. Impurities may be removed in one unit or in a series of units each intended to remove different ones of these impurities that are present or to reduce specific contaminants to the desired low levels. Stage 8 represents the impurities removal whether achieved by one unit or by more than one unit. Cooling and impurities removal are preferably performed in any effective sequence in a series of stages or all in one unit. Details are not shown but will be familiar to those skilled in the art. Stage 8 typically includes operations for final removal of impurities, non-limiting examples of which include particulates, $NH_3$, sulfur species and $CO_2$. The $CO_2$ removal is typically performed by a solvent-based process, which either uses a physical solvent, e.g. methanol, or a chemical solvent, e.g. amine.

The resulting cooled, conditioned gaseous stream 15 is then fed to stage 10 which represents any beneficial use of one or more components present in stream 15. That is, stream 15 can be used as-is as an end product. However, the present invention is particularly useful when stream 15 is to serve as feed material for further reaction and/or other processing that produces product designated as 20 in FIG. 1.

One preferred example of such further processing is conversion of stream 15 into liquid fuels, such as using stream 15 as feed material to a Fischer-Tropsch process or other synthetic methodology to produce a liquid hydrocarbon or a mixture of liquid hydrocarbons useful as fuel.

Other examples of useful treatment of stream 15 include the production of specific targeted chemical compounds such as ethanol, straight-chain or branched-chain or cyclic alkanes and alkanols containing 4 to 18 carbon atoms, aromatics, and mixtures thereof; or in the production of longer-chain products such as polymers.

The overall composition of stream 15 can vary widely depending on the composition of raw feedstock 1, on intermediate processing steps, and on operating conditions. Stream 15 typically contains (on a dry basis) 20 to 50 vol. % of hydrogen, and 10 to 45 vol. % of carbon monoxide.

However, it is preferred that one or more properties of stream 15 will continually exhibit a value, or a value that falls within a characteristic desired range, in order to accommodate the treatment that stream 15 is to undergo in stage 10 to produce a repeatable, reliable supply of product 20.

In a preferred practice of the present invention, the property of stream 15 that is relevant and that should be maintained within a desired ratio, is the molar ratio of hydrogen ($H_2$) to CO. For FT fuels production, the target range of $H_2$:CO molar ratio depends on the product being produced. For example, ethanol production is most efficient with $H_2$:CO within the range of 1.95 to 2.05. Synthetic gasoline production requires a $H_2$:CO ratio in the range of 0.55 to 0.65. For fuels production by other conversion mechanisms, such as biological conversion, the target range of $H_2$:CO molar ratio can be very large. According to the Wood-Ljungdahl pathway, depending on the type of bacteria being used, streams containing only CO, only $H_2$ or any combination of $H_2$:CO can be utilized due to the bacteria's ability to convert $H_2O$ and $CO_2$ into $H_2$ and CO as needed. Each bacterial strain will prefer a particular chemical makeup of syngas at which it is most efficient in producing the desired product.

Referring again to FIG. 1, processing in stage 10 may produce byproduct stream 26, which can be recycled to partial oxidation reactor 4 to be used as a reactant, and/or recycled to hot oxygen generator 202 (described below with respect to FIG. 2) to be combusted in hot oxygen generator 202 as described herein. Steam (stream 62) formed from water stream 61 in stage 6 can be optionally fed to partial oxidation reactor 4.

Figure 2:
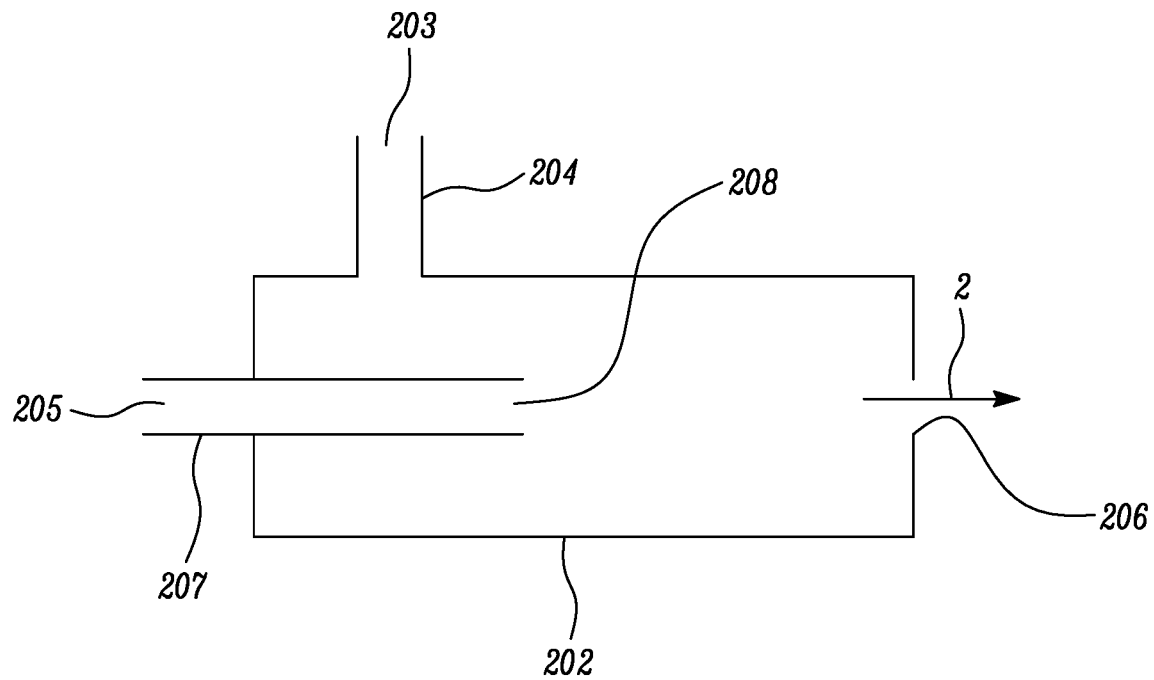
FIG. 2 is a cross-sectional view of a device that can produce a stream of hot oxygen useful in this invention.
Figure 3:
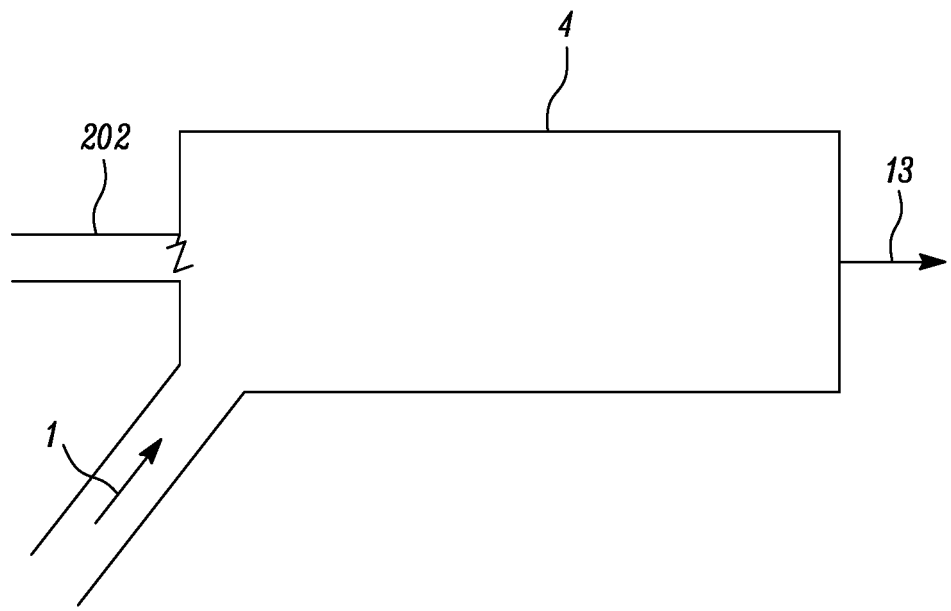
FIG. 3 is a cross-sectional view of a portion of the flowsheet of FIG. 1.

Referring to FIGS. 1-3, hot oxygen stream 2 is fed to partial oxidation reactor 4 to provide oxygen for the desired partial oxidation of raw feedstock 1, and to provide enhanced mixing, accelerated oxidation kinetics, and accelerated kinetics of the reforming with reactor 4.

There are many ways in which the desired high temperature, high velocity oxygen-containing stream can be provided, such as plasma heating.

One preferred way is illustrated in FIG. 2, namely hot oxygen generator 202, that can provide hot oxygen stream 2 at a high velocity. Stream 203 of gaseous oxidant having an oxygen concentration of at least 30 volume percent and preferably at least 85 volume percent is fed into hot oxygen generator 202 which is preferably a chamber or duct having an inlet 204 for the oxidant 203 and having an outlet nozzle 206 for the stream 2 of hot oxygen. Most preferably the oxidant 203 is technically pure oxygen having an oxygen concentration of at least 99.5 volume percent. The oxidant 203 fed to the hot oxygen generator 202 has an initial velocity which is generally within the range of from 50 to 300 feet per second (fps) and typically will be less than 200 fps.

Stream 205 of fuel is provided into the hot oxygen generator 202 through a suitable fuel conduit 207 ending with nozzle 208 which may be any suitable nozzle generally used for fuel injection. The fuel may be any suitable combustible fluid examples of which include natural gas, methane, propane, hydrogen and coke oven gas, or may be a process stream such as stream 26 obtained from stage 10. Preferably the fuel 205 is a gaseous fuel. Liquid fuels such as number 2 fuel oil or byproduct stream 23 may also be used.

The fuel in stream 205 and the oxidant stream 203 should be fed into generator 202 at rates relative to each other such that the amount of oxygen in oxidant stream 203 constitutes a sufficient amount of oxygen for the intended use of the hot oxygen stream. The fuel 205 provided into the hot oxygen generator 202 combusts therein with oxygen from oxidant stream 203 to produce heat and combustion reaction products which may also include carbon monoxide.

The combustion within generator 202 generally raises the temperature of remaining oxygen within generator 202 by at least about 500° F., and preferably by at least about 1000° F. The hot oxygen obtained in this way is passed from the hot oxygen generator 202 as stream 2 into partial oxidation reactor 4 through and out of a suitable opening or nozzle 206 as a high velocity hot oxygen stream having a temperature of at least 2000° F. up to 4700° F. Generally the velocity of the hot oxygen stream 2 as it passes out of nozzle 206 will be within the range of from 500 to 4500 feet per second (fps), and will typically exceed the velocity of stream 203 by at least 300 fps. The momentums of the hot oxygen stream and of the feedstock, should be sufficiently high to achieve desired levels of mixing of the oxygen and the feedstock. The momentum flux ratio of the hot oxygen stream to the feedstock stream should be at least 3.0.

The composition of the hot oxygen stream depends on the conditions under which the stream is generated, but preferably it contains at least 50 vol. % $O_2$ and more preferably at least 65 vol. % $O_2$. The formation of the high velocity hot oxygen stream can be carried out in accordance with the description in U.S. Pat. No. 5,266,024.

It will be recognized that the desired state of systems that employ partial oxidation in the course of producing hydrocarbon products is this: that there is little or no perturbation of the characteristics of the raw feedstock 1, of the oxygen stream 2, or of streams 13, 14 and 15, nor of the operating conditions employed in the partial oxidation reactor 4 and in stages 6 and 8.

However, circumstances may arise occasionally in which characteristics of raw feedstock 1 to the POx reactor change in a way such that, if nothing else changes in the operating conditions, the characteristics of stream 13 or 15 would be changed in a manner that would adversely affect the characteristics of the desired product stream 20. Such a change in stream 20 is, of course, undesirable.

The characteristics of raw feedstock 1 that could change include the total hydrocarbon concentration of the raw feedstock; the total concentration of $C_2H_2$, $C_2H_4$, and tars; and the temperature. Examples of circumstances that could cause any of these characteristics to change include:

The composition of raw feedstock 1 has changed because the feed to source 11 has changed.

The raw feedstock 1 from its source 11 has become too expensive relative to other compositions, from other sources, that could be useful feed material to the POx reactor 4.

The treatment provided in one or more of the stages 6 and 8 has changed, such as changes to the catalytic processing that is provided in the WGS reaction.

The injector system that feeds material into the POx reactor has been damaged or fouled so that the ability of the material fed to be entrained into the hot oxygen stream is lessened, thereby leading to excessive methane slip, excessive tar slip, and/or excessive soot formation.

In the past, customary practice to accommodate changes in circumstances such as these, which involve changes to characteristics of the raw feedstock 1 to POx reactor 4, has often been shutting down the overall facility, or at best running the facility at a partial load which is detrimental to capital recovery. When that occurs, an operator who has more than one such facility must then rely on the output of product that is available from other facilities, or else suffer the loss of production.

It has been found however that the present invention enables the operator to compensate for changes in the feedstock by adjusting one or more of the characteristics of the hot oxygen stream 2 (also referred to herein as the hot oxygen jet), via adjustment of the conditions by which the hot oxygen stream 2 is produced.

By characteristics of the hot oxygen stream 2 is meant any one or more of:

the physical properties of the hot oxygen stream 2, including its temperature, oxygen concentration, its feed rate into POx reactor 4, and velocity at which it is fed into POx reactor 4, as well as conditions under which the hot oxygen stream 2 is combined and reacted with the feedstock, including stoichiometric ratio.

The hot oxygen generator 202 is flexible with respect to the characteristics (such as the temperature, the composition, and the feed rate) of the feedstock it can handle, and because the hot oxygen generator 202 can be used to produce syngas directly, no physical changes need to be made to the hot oxygen generator 202 to accommodate to changes in any characteristic(s) of the feedstock to the partial oxidation reactor 4. Changes to the "conditions" of the hot oxygen generator operation are implemented to maintain appropriate operating conditions in the partial oxidation reactor 4 using the alternate fuel to produce stream 13 having characteristics that make stream 13 amenable to further treatment to product stream 15 having characteristics that have not changed relative to the characteristics before the inclusion of stream 3.

Figure 4:
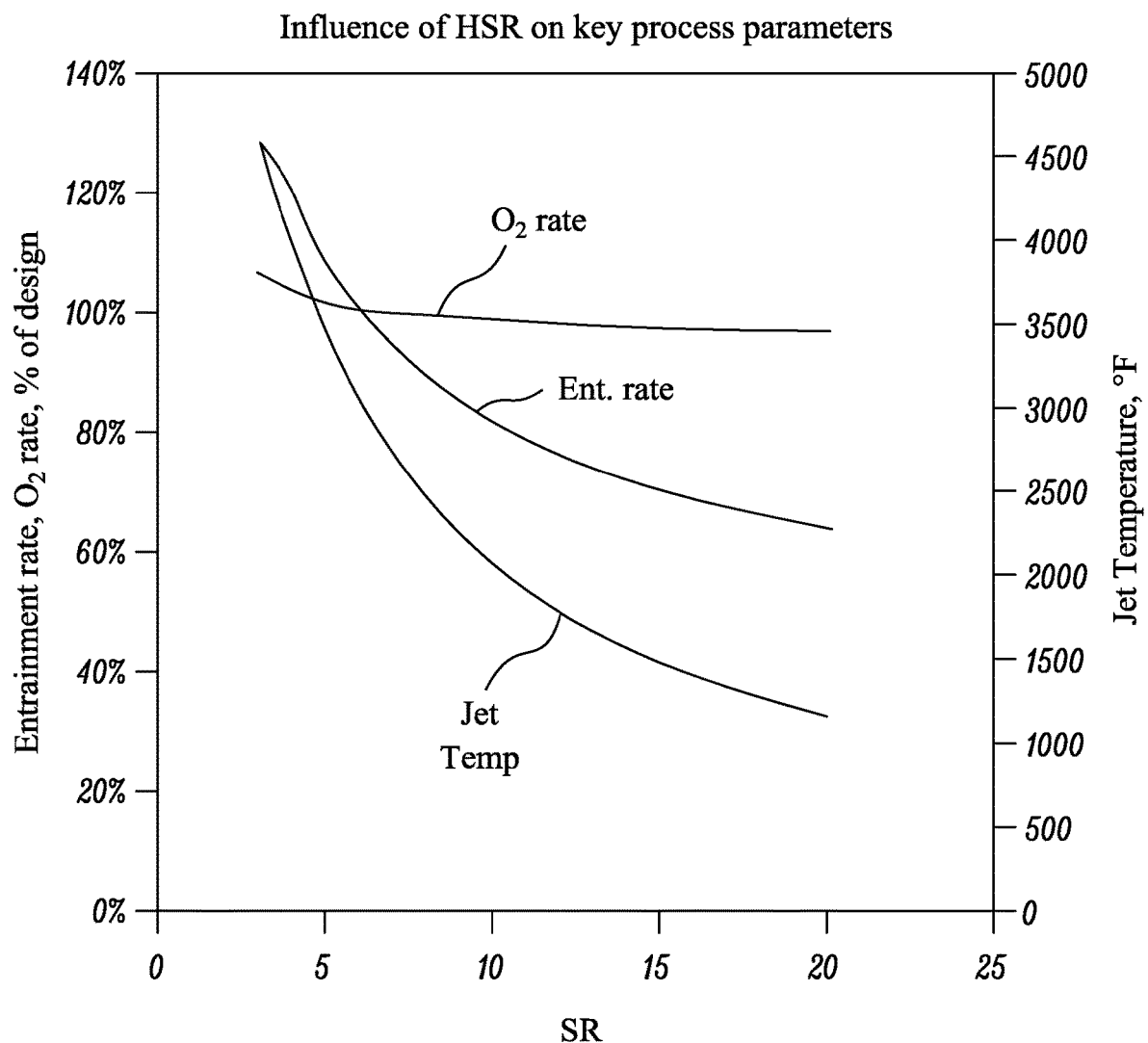
FIG. 4 is a graph showing the effect of HSR in a hot oxygen generator on the entrainment rate, oxygen feed rate, and temperature of the hot oxygen jet produced by the hot oxygen generator.

The hot oxygen generator provides a way of adjusting POx system operation, during operation and with no hardware changes, to compensate for changing operational circumstances. Properties of the hot oxygen jet exiting the hot oxygen generator are dependent on the stoichiometric ratio of oxygen and fuel inside the hot oxygen generator (HSR). Low HSR values produce jets with the highest temperature, highest entrainment rate and more reactive content (radicals such as OH, H and O). High HSR values produce jets with lower temperature, lower entrainment rate and fewer radicals, but require less fuel and consume less O2. FIG. 4 illustrates how temperature, entrainment rate and O2 rate vary based on HSR, assuming a system that requires a constant overall stoichiometry. FIG. 4 is meant to be representative of one potential system. HSR trends will be similar for other systems and can be estimated using standard jet theory calculations by those skilled in the art.

Adjustments to the HSR are easily made by controlling the relative rates of fuel and oxidant provided to the hot oxygen generator. This allows an operator to optimize how the hot oxygen jet interacts with the feedstock. This optimization can happen during operation, without any hardware changes, which is very convenient and delays or prevents the need to shut the plant down. This operational flexibility to a plant can be very valuable if production is required.

Typical values of feedstock 1 vary widely, but may often lie in the following ranges:
Total hydrocarbon content: 5-100%
Total content of ($C_2H_2+C_2H_4$+tars): 0-5%
Temperature: ambient to 800° F.-1400° F.
Those with experience in this technical field will recognize that these values will vary widely depending on the nature of the feedstock. For example, natural gas would comprise predominantly carbon and hydrogen, as would liquid petroleum products which however would comprise proportionally more carbon than in natural gas; whereas syngas derived from biomass would also comprise steam, tar, carbon dioxide, heavier hydrocarbons, and thus more oxygen than the above feedstocks, as would be expected with pyrolysis oils and less so with refinery off gases.

Typical values of properties of the hot oxygen jet often lie in the following ranges:
Temperature: 2000-4700° F.
Velocity: 500-4500 ft/s
O2 content: 50-90%
Typical values of partial oxidation conditions often lie in the following ranges:
Temperature in the POx reactor: 2550° F., but as low as 2400 F and as high as 2650 F.
Residence time in the POx reactor; 2-10 sec
Pressure in the POx reactor: atmospheric to 600 psig—but can be as high as the process requires.
Pressure is usually set on the basis of downstream processing requirement or limitations of the biomass gasifier feeding system.

Specific oxygen consumption in the partial oxidation will vary based on the properties of the feedstock (which are widely variable) and is highly correlated to operating temperature.
Ratio of oxygen in the hot oxygen jet used in the partial oxidation to the feedstock: This depends on HSR, which is described below
Entrainment rate of the feedstock into the hot oxygen jet: This depends on both the HOB properties and the properties of the feedstock stream being entrained into the jet. For example, a less dense feedstock (one that is hotter or when operating at lower pressure) will entrain less rapidly than a dense feedstock.

Typical values of the conditions in the hot oxygen generator to produce the hot oxygen stream often lie in the following ranges:
HSR in the hot oxygen generator: preferably 3-6, but could be as high as 20.
Temperature of the oxygen that is fed to the hot oxygen generator: ambient—400° F.

Typical characteristics of the syngas produced by the POx reactor often lie in the following ranges:
Temperature: 2550° F., but as low as 2400 F and as high as 2650 F.
Soot concentration: 0-0.02 gm/Nm3
$CH_4$ concentration:0-1%, preference is as low as possible, but practical limits on reactor temperature will limit how far it can be reduced. Usually end up operating around 0.5%.
Tar content: 0 gm/Nm3—cannot tolerate any tars, which would eventually deposit on downstream equipment and stop operation.

As indicated herein, the hot oxygen generator provides the operator the ability to respond to changes in one or more of the characteristics of the feedstock 1, by adjusting one or more of the characteristics of the hot oxygen stream.

Table 1 summarizes the changes to the hot oxygen stream that could be utilized to respond to changes of feedstock characteristics, so as to restore the product in stream 15 to values that differ by a lesser increment (or differ not at all) from the desired values thereof prior to the change of conditions.

TABLE 1

| A: Feedstock characteristic and change | B: Expected effect on syngas product if the feedstock characteristic changes without adjustment of POx conditions | C: Characteristic of hot oxygen stream to change, and nature of the change (increase/decrease/magnitude) to counteract expected effect on the syngas product | D: Condition of hot oxygen generator to modify, and nature of the change, to change the characteristic of hot oxygen stream in Column C |
|---|---|---|---|
| Total hydrocarbon concentration increases (first example below) | Potential for increase in soot due to mixing into a jet optimized for fewer hydrocarbons. Mixing in large amounts of hydrocarbons into a high temperature jet too quickly will cause hydrocarbons present to crack due to local lack of oxidizing species (such as O2 or other radicals) | Decrease the temperature of the jet and reduce the entrainment rate. | Reduce HSR by decreasing the fuel feed rate while holding O2 feed rate constant or increase the O2 feed rate while holding the fuel feed rate constant. |
| Total hydrocarbon content decreases | Potential for increase in soot due to mixing into a jet optimized for more hydrocarbons. If fewer hydrocarbons are available, the mixing rate may not be high enough, which would allow | Increase the temperature of the jet and increase the entrainment rate. | Reduce HSR by holding O2 feed rate constant and increasing fuel feed rate or by holding fuel feed rate constant and decreasing O2. |

TABLE 1-continued

| A: Feedstock characteristic and change | B: Expected effect on syngas product if the feedstock characteristic changes without adjustment of POx conditions | C: Characteristic of hot oxygen stream to change, and nature of the change (increase/decrease/magnitude) to counteract expected effect on the syngas product | D: Condition of hot oxygen generator to modify, and nature of the change, to change the characteristic of hot oxygen stream in Column C |
|---|---|---|---|
| | hydrocarbons present to crack in the hot furnace environment prior to being entrained into the jet. | | |
| Temperature increases | Increasing the feedstock temperature decreases the rate of entrainment into the jet, potentially increasing soot by allowing hydrocarbons to heat up unreacted in the hot furnace environment (cracking) | Increase the entrainment rate of the jet | Decrease the HSR by holding O2 feed rate constant and increasing fuel feed rate or holding fuel feed rate constant and decrease O2 feed rate. |
| Temperature decreases | Decreasing feedstock temperature will increase the entrainment rate into the jet, potentially increasing soot by forcing hydrocarbons into the hot jet without sufficient time to react before cracking to soot | Decrease entrainment rate | Increase HSR by holding O2 feed rate constant and decreasing fuel feed rate or holding fuel feed rate constant and increasing O2 feed rate |
| Feedstock injector is damaged | Physically diverts feedstock away from jet, increasing soot by allowing hydrocarbons to crack in the hot furnace environment prior to entraining into the jet | Increase the entrainment rate of the jet to reduce time in the hot furnace environment. | Decrease the HSR by holding O2 feed rate constant and increasing fuel feed rate or holding fuel feed rate constant and decreasing O2 feed rate. |
| Load is reduced from design condition | Lower O2 feed rate is required, which results in a lower entrainment rate. This could result in an increase in soot due to hydrocarbons having more time in the hot furnace prior to being entrained by the hot jet. | Increase entrainment rate | Decrease the HSR by holding O2 feed rate constant and increasing fuel feed rate or holding fuel feed rate constant and decreasing O2 feed rate. |
| Load is increased from design condition | Higher O2 feed rate is required, which increases entrainment rate. This could result in an increase in soot formation due to hydrocarbons being pulled too quickly into the high temperature hot oxygen jet. | Reduce entrainment rate and hot oxygen jet temperature. | Increase HSR by holding O2 feed rate constant and decreasing fuel feed rate or holding fuel feed rate constant and increasing O2 feed rate |

The present invention provides several advantages.

One advantage is that there is no need for an additional unit to provide feedstock to POx reactor 4, to accommodate cutbacks, shutdowns, or other changes to raw feedstock 1. The hot oxygen generator is already present in the overall plant, being used with the partial oxidation reactor. Because the hot oxygen generator is flexible to what feedstock is being processed, it can be utilized in the same plant to produce gas from the alternate feed stream 3. Providing this alternative way to generate gas stream 15 decouples POx reactor 4 and the stages 6 and 8 downstream from POx reactor 4, and their related equipment, from reliance on one particular source 11 of feedstock to the POx reactor. Utilizing the hot oxygen generator 202 provides the plant with the ability to produce stream 15 and product 20 more fully.

This advantage in turn enables a plant that is designed to produce a product having a desired set of characteristics (such as a plant to produce renewable/biomass derived liquid fuels) to continually produce product at rates near or above the nameplate capacity of the plant. This lets the operator avoid the alternative of producing nothing, decreasing the plant uptime, and decreasing potential plant revenue.

Examples

One example of how this type of operational flexibility is valuable is if the feedstock composition changes slightly. Sudden and unanticipated changes in feedstock occur even at plants where the feedstock is from a reliable source, such as a natural gas pipeline. In normal practice, a change in feedstock composition should be accompanied by a change in $O_2$ feed rate to the POx reactor through the hot oxygen generator. in order to maintain the desired outlet syngas quality. If the change is unnoticed (feedstock composition is not typically monitored continuously), the total POx stoichiometry will change and suboptimal performance will result. If fuel content decreases and the $O_2$ rate remains constant, too much $O_2$ will be supplied to the system, resulting in lower production (burning product $H_2$ and CO) and higher POx temperatures. If the fuel content increases, not enough $O_2$ is supplied, resulting in lower POx temperature and an increase in soot. Neither operational condition is desired and an increase in soot load in particular is undesired because it can result in premature shutdowns to clean the downstream equipment.

Table 2 gives an example where the fuel content in a feedstock stream is increased. A portion of the methane content is displaced with ethane. Maintaining the feedstock rate introduces more C and H atoms into the system, in this example reducing the total stoichiometry from 0.310 to 0.299. If a system is running at the optimal condition, this increase in fuel will likely result in additional soot. A typical operational response to counter a higher than acceptable soot level is to increase the overall amount of oxygen provided to the POx system. This approach requires higher $O_2$ usage and may reduce the overall syngas ($H_2$+CO) yield by converting more of the feedstock to $CO_2$ and $H_2O$. For this example, to maintain the TSR at 0.310 the $O_2$ rate needs to increase from 66.3 lbmol/hr to 68.7 lbmol/hr, nearly 4% higher (or a comparable reduction in feed rate).

Adjusting HSR while maintaining the total overall amount of 02 sent to the system could be used to reduce additional soot formation by changing how aggressively the jet interacts with the feedstock. In this example, the increase in soot formation may be due to the relative amounts of carbon and oxygen, but it may also be due to how the oxygen jet is interacting with the feedstock. The jet may be entraining too fast, resulting in the carbon rich feedstock being exposed too quickly to the hot oxygen jet. By increasing the HSR, an operator can decrease how quickly the jet entrains the feedstock, restoring POx operation to acceptable levels of soot while maintaining the design $O_2$ rate. In this example, changing the HSR from 6 to 18.7 results in the same total stoichiometry while maintaining the design $O_2$ rate. Of course, operators could also make standard adjustments of decreasing the feedstock flowrate or increasing the O2 flowrate, but the system will not be at optimal mixing conditions. Adjusting HSR enables the operators to restore optimal operation of the HOB jet at a condition other than what was originally designed for.

TABLE 2

Change in Feedstock composition.

|  | Design | Abnormal | O2 rate adjusted | HSR adjusted |
|---|---|---|---|---|
| CH4 | 97.0% | 92.0% | 92.0% | 92.0% |
| C2H6 | 2.50% | 7.50% | 7.50% | 7.50% |
| CO2 | 0.25% | 0.25% | 0.25% | 0.25% |
| N2 | 0.25% | 0.25% | 0.25% | 0.25% |
| Total | 100.0% | 100.0% | 100.0% | 100.0% |
| Stoich O2 | 2.03 | 2.10 | 2.10 | 2.10 |
| Feed, lbmol/hr | 100 | 100 | 100 | 100 |
| TSR | 0.310 | 0.299 | 0.310 | 0.310 |
| O2 rate, lbmol/hr | 66.3 | 66.3 | 68.7 | 66.3 |
| HSR | 6 | 6 | 6 | 18.7 |

Another example is if the refractory in the vessel or feedstock inlet system degrades. This could influence the aerodynamics of the feedstock, which could prevent the feedstock from efficiently contacting the oxidant. For feedstocks containing tar, this might result in tar exiting the POx system and causing fouling of downstream equipment, or soot forming due to long residence times in a hot reactor, also fouling downstream equipment. The typical response to this is to shut the system down and perform maintenance to the system. The operator can decrease the HSR of the hot oxygen generator. Referring again to FIG. 4, a decrease in HSR has the effect of increasing the entrainment rate of the hot oxygen jet, which will more aggressively mix with the feedstock, ensuring that all tar contained in the incoming feedstock is converted.

Another example is when a POx system operates at a lower production rate. Reducing the production and maintaining all other operational parameters has the result of slowing down the oxidant injection, which similarly to the example of refractory degradation may result in tar or other hydrocarbon slip. A reduction in feedstock results in an increase in residence time in the POx unit, which may compensate for the decreased mixing. However, if the increased residence time is insufficient to offset the decreased mixing the HSR can be adjusted down to increase the mixing intensity and continue production with no tars exiting the POx.

What is claimed is:

1. A method of carrying out partial oxidation of carbonaceous feedstock to produce syngas, comprising (A) (i) feeding to a partial oxidation reactor feedstock comprising hydrocarbons, the hydrocarbons optionally including $C_2H_2$, $C_2H_4$, and tars, the feedstock having a given total hydrocarbon concentration, a given concentration of $C_2H_2$, $C_2H_4$, and tars, and a given temperature, (ii) partially oxidizing the feedstock in the partial oxidation reactor, using a hot oxygen jet that has given values of its temperature, velocity, and $O_2$ concentration, at given partial oxidation conditions of temperature, residence time, pressure, specific oxygen consumption, ratio of oxygen in the hot oxygen jet used in the partial oxidation to the feedstock, and entrainment rate of the feedstock into the hot oxygen jet, (iii) wherein the hot oxygen jet is produced by reaction of oxygen and fuel in a hot oxygen generator at a given stoichiometric ratio (HSR) in the hot oxygen generator and a given temperature of the oxygen that is fed to the hot oxygen generator, (iv) to produce syngas having given values of temperature, soot concentration, CH4 concentration, and tar concentration;

(B) while maintaining the given partial oxidation conditions of (A) (ii) using the hot oxygen jet having the given values set forth in (A) (ii), feeding to the partial oxidation reactor a changed feedstock in which at least one of the total hydrocarbon concentration, the $C_2H_2$ concentration, the $C_2H_4$ concentration, the tars concentration, and the temperature of the feedstock fed to the partial oxidation reactor is changed to produce syngas having a temperature, soot concentration, CH4 concentration, and tar concentration, at least one of which differs from its given value according to (A) (iv) by a given increment;

(C) in response to the changed feedstock in step (B), changing at least one of the values of temperature, velocity, and $O_2$ concentration, of the hot oxygen jet from its value in (A) (ii) to produce a changed hot oxygen jet, by changing one or more of the HSR in the hot oxygen generator and the temperature of the oxygen that is fed to the hot oxygen generator to produce the hot oxygen jet in the hot oxygen generator, and (D) partially oxidizing said changed feedstock in said partial oxidation reactor with said changed hot oxygen jet, to produce syngas whose temperature, soot concentration, $CH_4$ concentration, or tar concentration, which differed in (B) from the given value thereof according to (A) (iv), differs from said given value by an increment that is less than the increment thereof set forth in (B).

2. A method according to claim 1 wherein unreacted hydrocarbon in said product stream, or products obtained by reaction of said unreacted hydrocarbon recovered from the product stream, is recycled to the reactor in which the partial oxidation is performed.

3. A method according to claim 1 wherein the hydrocarbonaceous feedstock material comprises natural gas.

4. A method according to claim 1 wherein the hydrocarbonaceous feedstock material comprises biomass.

5. A method according to claim 1 wherein the hydrocarbonaceous feedstock material is derived from fossil fuel.

6. A method according to claim 1 wherein the partial oxidation is carried out with a gaseous stream comprising at least 50 vol. % oxygen.

7. A method according to claim 1 wherein the partial oxidation is carried out by feeding oxygen into the reactor at a velocity of 500 to 4500 feet per second.

8. A method according to claim 1 wherein the partial oxidation is carried out by feeding oxygen into the reactor at a temperature of at least 2000° F.

9. A method according to claim 1 wherein in step (B) the changed feedstock is formed by changing the total hydrocarbon concentration of the feedstock fed to the partial oxidation reactor.

10. A method according to claim 1 wherein in step (B) the changed feedstock is formed by changing the $C_2H_2$ concentration of the feedstock fed to the partial oxidation reactor.

11. A method according to claim 1 wherein in step (B) the changed feedstock is formed by changing the $C_2H_4$ concentration of the feedstock fed to the partial oxidation reactor.

12. A method according to claim 1 wherein in step (B) the changed feedstock is formed by changing the tars concentration of the feedstock fed to the partial oxidation reactor.

13. A method according to claim 1 wherein in step (B) the changed feedstock is formed by changing the temperature of the feedstock fed to the partial oxidation reactor.

* * * * *